(12) United States Patent
Richardson et al.

(10) Patent No.: US 6,278,996 B1
(45) Date of Patent: Aug. 21, 2001

(54) SYSTEM AND METHOD FOR MESSAGE PROCESS AND RESPONSE

(75) Inventors: Keith D. Richardson, Palo Alto; Jeff Greif, Venice; Doug Buedel, Novato; Boris Aleksandrovsky, San Rafael, all of CA (US)

(73) Assignee: Brightware, Inc., Novato, CA (US)

( * ) Notice: Subject to any disclaimer, the term of this patent is extended or adjusted under 35 U.S.C. 154(b) by 0 days.

(21) Appl. No.: 09/052,520

(22) Filed: Mar. 30, 1998

Related U.S. Application Data
(60) Provisional application No. 60/042,878, filed on Mar. 31, 1997.

(51) Int. Cl.[7] ...................................................... G06F 17/30
(52) U.S. Cl. ..................................... 707/6; 707/104; 707/5
(58) Field of Search ............................ 704/9, 10; 705/42; 706/25, 46; 709/204, 207; 345/339; 370/407; 395/200.31; 434/350; 128/905; 707/104, 5, 6

(56) References Cited

U.S. PATENT DOCUMENTS

| | | | |
|---|---|---|---|
| 4,914,590 | * | 4/1990 | Loatman et al. ......................... 704/8 |
| 5,243,520 | * | 9/1993 | Jacobs et al. ............................ 704/9 |
| 5,404,295 | * | 4/1995 | Katz et al. .............................. 707/2 |
| 5,548,506 | * | 8/1996 | Srinivasan ............................... 705/8 |
| 5,559,693 | * | 9/1996 | Anick et al. ............................. 704/9 |
| 5,581,664 | * | 12/1996 | Allen et al. ............................ 706/46 |
| 5,590,322 | * | 12/1996 | Harding et al. .......................... 707/4 |
| 5,627,764 | * | 5/1997 | Schutzman et al. ................... 709/207 |
| 5,722,418 | * | 3/1998 | Bro ...................................... 128/905 |
| 5,765,028 | * | 6/1998 | Gladden ................................ 706/25 |
| 5,778,150 | * | 7/1998 | Chan et al. ............................ 706/46 |
| 5,823,788 | * | 10/1998 | Lemelson et al. ................... 434/350 |
| 5,832,448 | * | 11/1998 | Brown .................................... 705/2 |
| 5,862,325 | * | 1/1999 | Reed et al. ....................... 395/200.31 |
| 5,877,759 | * | 3/1999 | Bauer ................................... 345/339 |

(List continued on next page.)

OTHER PUBLICATIONS

Motiwalla, Luvai F., "An Intelligent Agent for Prioritizing E–mail Messages," Information Resources Management Journal, pp. 16–24, Apr. 1, 1995.*

*Primary Examiner*—Thomas Black
*Assistant Examiner*—Charles L. Rones
(74) *Attorney, Agent, or Firm*—Merchant & Gould P.C.

(57) ABSTRACT

A message understanding and response system recognizes and answers messages based on the message writer's intent in unconstrained natural language text messages. The system has a set of knowledge bases with linked domain specific words, phrases, and regular expressions relating to the domain of the writer and the domain of the respondent. The writer's domain is represented by special purpose lexicons linked to representations of typical intents. The typical intents are linked to a domain knowledge base of typical and appropriate respondent actions. The system is initialized by manually classifying a training text corpus according to the respondent's policies. A lexical analysis tool with prototypical intents and phrases indicating intents is applied to the training text corpus, which includes the domain specific characteristics of both the writer and the respondent. The output results are an operable knowledge base which is a conjunction of keywords used to communicate between the two domains of the writer and the respondent. During automatic operation, the input text is pre-processed to remove irregularities in a manner similar to how the data in the training text corpus was regularized. Sets of extracted keywords and concepts are matched against the sets of stored, pre-classified keywords and concepts, producing a list of intents. The intents and other extracted features are then mapped to appropriate actions as defined by the system operator. The actions use the common linked domain knowledge terms to formulate a textual reply which is tailored to and answering the intent of writer of the input message.

15 Claims, 6 Drawing Sheets

U.S. PATENT DOCUMENTS

| | | | |
|---|---|---|---|
| 5,878,386 | * | 3/1999 | Coughlin .................................. 704/10 |
| 5,890,103 | * | 3/1999 | Carus ........................................ 704/9 |
| 5,894,558 | * | 4/1999 | Falker .................................. 370/407 |
| 5,920,848 | * | 7/1999 | Schutzer et al. ....................... 705/42 |
| 5,930,471 | * | 7/1999 | Milewski et al. .................... 709/204 |
| 5,953,718 | * | 9/1999 | Wical ........................................ 707/5 |
| 6,026,410 | * | 2/2000 | Allen et al. ........................... 707/104 |
| 6,038,561 | * | 3/2000 | Snyder et al. ............................ 707/6 |
| 6,052,693 | * | 4/2000 | Smith et al. ......................... 707/104 |
| 6,078,918 | * | 6/2000 | Allen et al. .............................. 707/6 |
| 6,182,059 | * | 1/2001 | Angotti et al. ......................... 706/45 |

* cited by examiner

SYSTEM AND METHOD FOR MESSAGE PROCESS AND RESPONSE

CROSS-REFERENCES TO RELATED APPLICATIONS

This application claims priority of U.S. Provisional Application Serial No. 60/042,878, filed Mar. 31, 1997, which is incorporated herein by reference for all purposes.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD OF INVENTION

The present invention is directed to a method and apparatus for automatically recognizing and responding to intent in message text, particularly as used in a large-scale automatic message response system to examine input text and respond appropriately with output text relevant to the writer's intent.

BACKGROUND OF THE INVENTION

Electronic textual interchange is pivotal to businesses, academic institutions and private correspondence, and those recipients of electronic messages are being inundated with messages because of the increased popularity of electronic messaging and the migration to that medium from other messaging media, such as telephone calls, telegrams, physical (postal) mail, newspapers and magazines. This increase is, in part, due to the ease of access, the low cost of electronic exchange and because electronic messaging can be sent asynchronously and received quickly. While this medium allows for large amounts of information exchange, providing quick, relevant, and consistent responses to messages becomes increasingly difficult as the number of messages increases.

To alleviate these problems, some automated response systems have been proposed, with only limited success. In general, an automated response system processes an input message, attempts to "understand" what the writer is saying in the message, formulates an appropriate response and routes that response to the sender. Since many of the input messages are free-form text, a natural language processor and reasoning system is often used to "understand" what the input message is conveying, i.e., the intent of the sender. The term "understand" means the identification of information which corresponds to analogous situations previously identified by humans.

A typical message understanding system identifies words and other patterns in text, combining algorithmic and empirical methods to draw comparisons to known situations. Once the message is understood, a text generation system might be used to generate the response message text so that the entire communication response process is automated. The message understanding system might also include a classifier which understands the content of a message and routes or categorizes the message based on its content.

A number of approaches have been developed for automating text understanding and response. One approach to text understanding is to codify rules of natural language grammar. This approach is problematic because the rules of grammar are complicated, as well as incomplete, so systems based on them are difficult to produce and maintain. Another approach is to use statistical analysis of words within a text corpus, as is used in neural networks. Statistical analysis systems have the advantage that they are less difficult to maintain, but have the disadvantage that they are of limited usefulness where large amounts of relevant training data are not available.

Another approach to the problem of text understanding is to constrain and simplify the input message text. One way to do this is to have the writer of the input text use forms with limited choices and constrained syntax. Computer languages, with rigid and constrained syntax, are examples of how a user can communicate precisely with computers. While this approach greatly reduces the complexity of the process of automatic interpretation, it also requires prolonged, specialized user training.

Whether the messages are constrained or free-form, a message response system must first understand the input message text before it can process and respond to the message. One way to simplify the understanding and response process is to require manual intervention. The manual intervention approach has a number of drawbacks, since the process takes time and labor, requires training for reviewers and might result in inconsistency in responses from different reviewers. A manual review process might have the reviewer read a message and input a set of keywords, a classification, and/or a response. One approach to automating the manual process is to extract keywords from the input message and use them to compose a template response text. The drawback to this approach is that the keywords are chosen indiscriminately and are possibly irrelevant to the central intent of the input message text.

A problem with all the foregoing systems, with the exception of some applications of neural networks, is that system maintenance requires many of the same specialized skills required for original application development. Neural network systems can avoid that requirement, but they are limited to environments having a considerable amount of training data, a requirement which increases commensurately with the desired precision of classification. These systems classify without respect to meaning, i.e., irrelevant words are ineffectively separated from those central to intentionality.

Therefore, what is needed is a set of tools in a message text understanding and response system which reduces the requirement for specialized skills to produce and maintain domain specific applications.

SUMMARY OF THE INVENTION

An improved message text understanding and response system is provided by virtue of the present invention. In one embodiment of an understanding and response system, the system isolates the writer's critical words which relate to prototypical statements stored in the system. These in turn are mapped to models which represent understanding of the writer's possible intents. The writer's intents are then mapped to prototypical response actions as defined by the system operators. Thus the system models typical message writer requests and answers by selecting among typical responses.

To accomplish this, a tokenizing identifier accepts input message text and analyzes the text against a lexicon specific to the system operator's domain, in order to generate a structured data representation of input message text. The structured data and message text is fed to an intent identifier, which uses the structured text and a knowledge base to infer the intent of the writer of the input message. Intent determination can be supplemented by verifying and augmenting input message data against databases outside the system. The identified intents, and possibly the structured data and the message text itself, are passed to a response formulator, which assembles a set of actions according to a set of business rules to formulate a response. The assembled potential actions are evaluated and executed. Examples of potential actions include responding to the writer, giving recommendations for the next step in processing, possibly outside the system, routing the message to a third party for automatic or manual response, or invoking an external system.

The response message text, as well as the input message text, can be transported between the system and the writer of the message using conventional message transport techniques. The input message text can be electronic mail and may include text and other computer formats such as documents, graphic representations, formatted fields, and computer control characters. If the input message contains special formats of structured data, those are flagged for special processing which uses the additional information provided by the structure. The response actions can include: responding to the writer, creating a message summary for later review by system operators, forwarding the message for manual review, output the message to printers and facsimile machines, adding items to workflow systems, etc.

A further understanding of the nature and advantages of the inventions herein may be realized by reference to the remaining portions of the specification and the attached drawings.

DESCRIPTION OF THE PREFERRED EMBODIMENTS

One embodiment of the present invention provides a framework for recognizing, storing, and matching domain knowledge about input message text and the domain of the possible response actions. The input system interfaces with message text systems such as electronic mail, and the output interface encompasses a variety of appropriate response actions including message text responses, message forwarding, summaries of message text for later review, interfaces to printers and facsimile machines, and addition of items to workflow systems.

A preferred embodiment of a message text understanding and response system according to the present invention is shown in the figures. Using this system, the intent of a writer of an input text message is determined from the text of the message, and the system responds to that intent in a way that is appropriate to the system operator's domain. In a simple case, a company's customer service department might use the system to automatically act on messages received from customers. The system determines the customer's intent, to the extent that it relates to the company's customer needs, and takes an action appropriate for that intent. If the intent of the customer (as evidenced by the text of the message) is a request for information on a particular product, the system might respond by sending a message back to the customer with the requested information. However, in more complex or ambivalent cases, various answers are possible. Also, the system might take an action which is not what the customer intended, but what the company intends for that situation.

The system recognizes phrase types and intents from input text and maps these to domain knowledge pertaining to common kinds of intents. The intents are in turn mapped to actions. Phrase types, intents and actions have an association where each is dependent on the others for overall meaning and utility. It is the conjunction of phrase types, intents and actions which form single associations which constitute a reasonable response to an input text message. The input message arrives at the system via electronic mail, network transport, or any number of well-known communication methods. The source of the input message is referred to as the writer. The writer is usually a person, but might also be another computer system. The action of the system in response to the input message can take a variety of forms, such as sending a response message to the writer, forwarding the message to another person or computer system for further handling, summarizing the message for later handling, outputting to printers or facsimile machines, or adding items to workflow systems.

Figure 1:
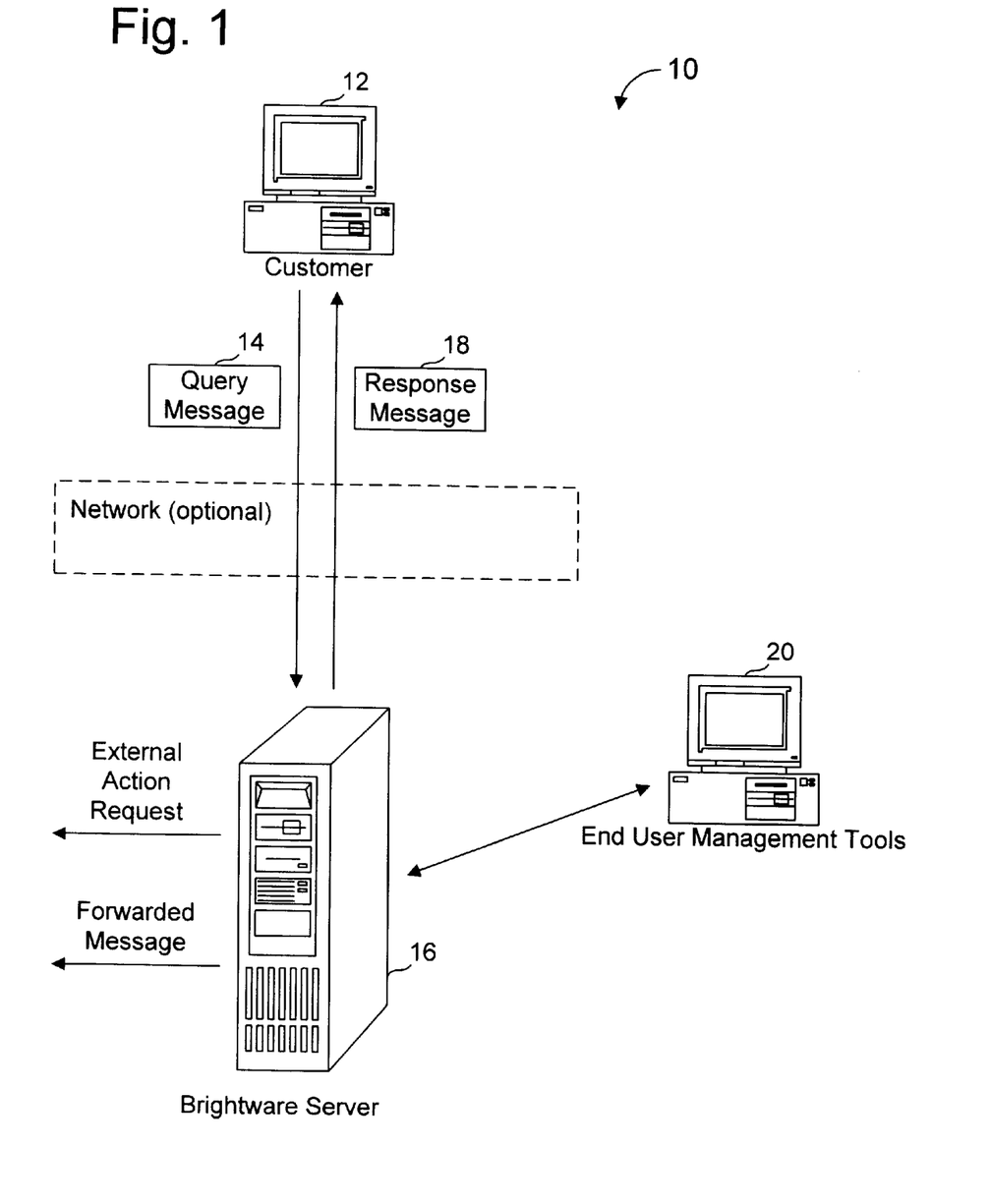
FIG. 1 is a block diagram of a computer system over which messages are sent to a server for automatic handling according to the present invention.

FIG. 1 illustrates a network 10 in which an embodiment of the present invention is implemented. In network 10, a customer system 12 is coupled to a server 16 either directly or over a network to send input message 14. Use of customer system 12 is not limited to internal customer messaging, but can be used by anyone who wishes to communicate with the customer's company. Customer system 12 sends input message 14 to server 16 for processing. If a network is interposed between customer system 12 and server 16, it could be a local area network, the Internet, an intranet, an extranet, or the like. Server 16 is adapted to take an action based on an internal knowledge base and the text of query message 14. If the action is a response message 18, that response message 18 is sent to customer system 12. If the action is an external action or a forwarded message, those are sent to other systems (not shown).

Network 10 is also shown including a management system 20 including end-user management tools for modifying the knowledge base (not shown; see FIG. 12) in server 16 according to the response policies and business practices of the operator of server 16. In the preferred embodiment, server 16 is the Brightware™ BrightResponse™ automated message understanding and response system developed by Brightware, Inc. of Novato, Calif. and preferably customized to the particular business needs of the operator of the server (the "system operator").

Figure 2:
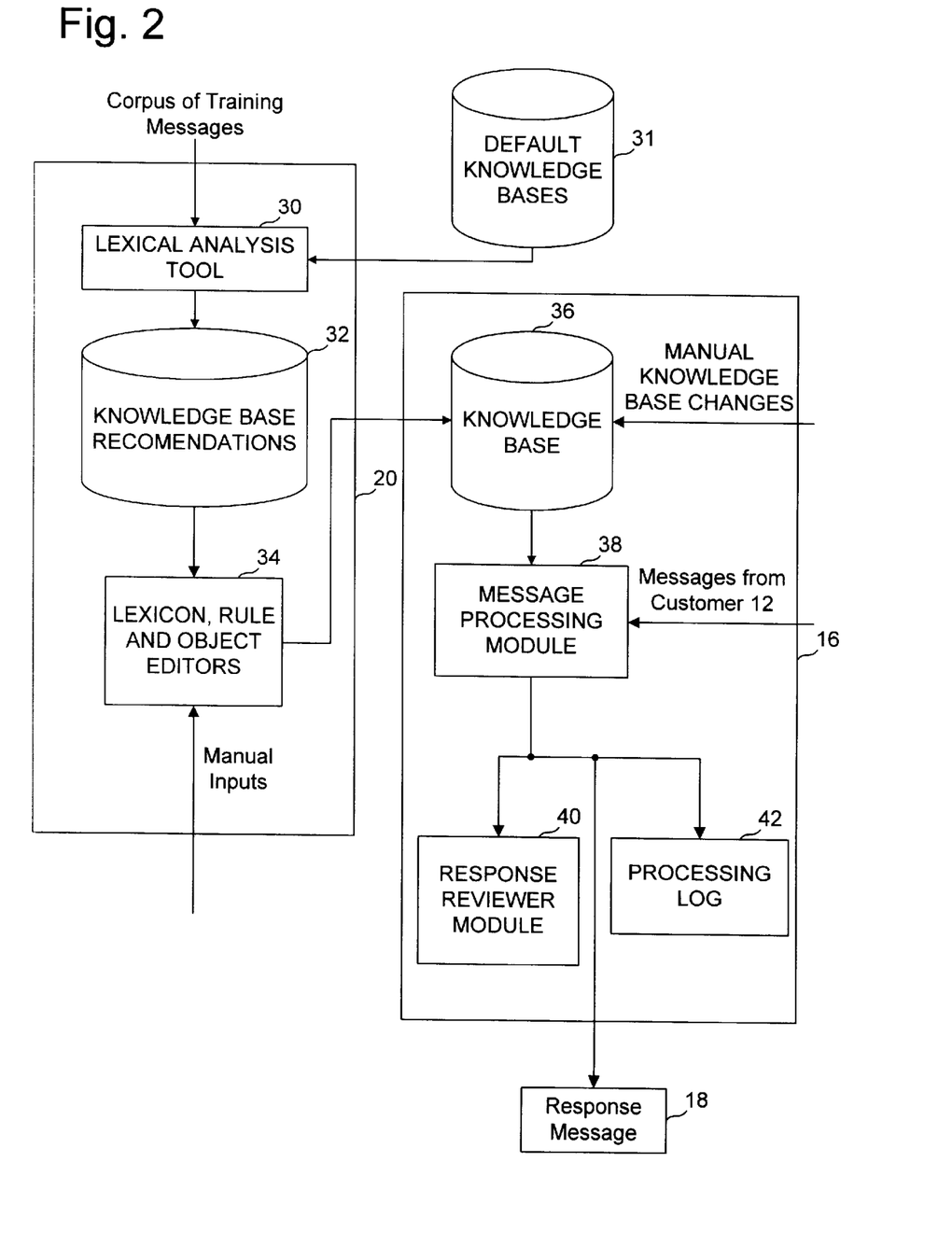
FIG. 2 is a more detailed block diagram of elements of the message text understanding and response system shown in FIG. 1.

FIG. 2 shows server 16 and management system 20 in greater detail. Management system 20 is shown comprising a lexical analysis tool 30, a default knowledge base 31, storage for knowledge base recommendations 32 and editors 34 for editing the lexicon, rules and objects. Before the regular automatic response operation, the lexical analysis tool 30 is fed a corpus of training messages and provided with default knowledge base 31 to arrive at recommendations for the contents of the knowledge base to be used in processing messages. Those recommendations can be edited by the end user (the operator of server 16) before they are included in the knowledge base. The knowledge base (36) is shown as part of server 16, along with a message processing module 38 and a response viewer module 40. Message processing module 38 uses knowledge base 36 and the input message to determine what actions to take, be it sending back message 18, sending a request to response viewer module 40 and/or adding to a processing log 42.

Generally, customer system 12, server 16 and management system 20 are general purpose computer systems programmed according to their use and comprising one or more central processing unit, memory (ROM and RAM), and associated peripheral equipment, such as disk drives, compact discs, printers, facsimile machines and video display terminals. The programs used to implement the programming might reside in memory, in one of the storage devices, or a combination of the two. Knowledge base 36 is maintained on a disk drive and/or memory within server 16, but might also include portions resident on remote storage systems.

Figure 3:
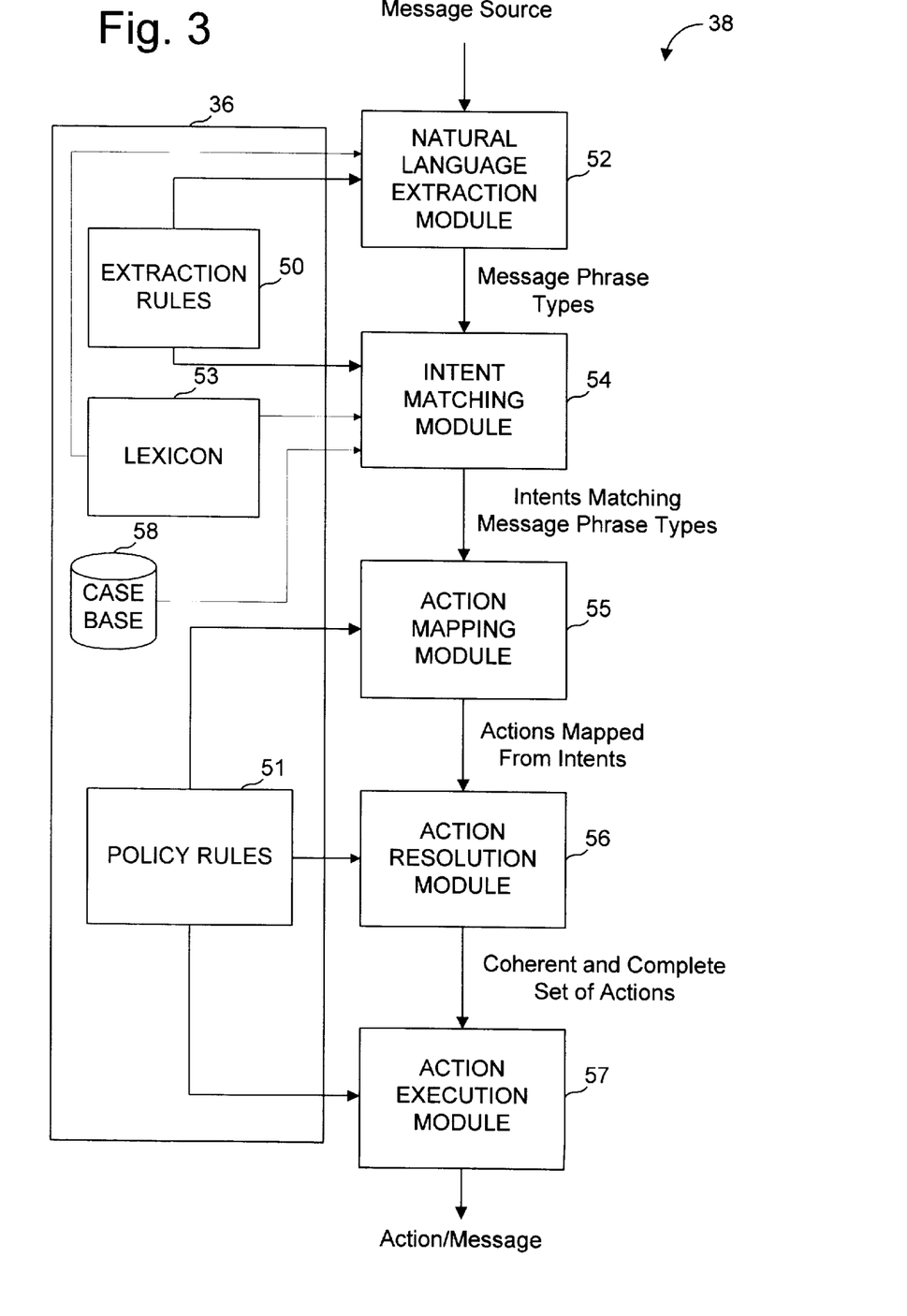
FIG. 3 is a more detailed block diagram of the message processing module shown in FIG. 2.

Referring now to FIG. 3, details of message processing module 38 and its connections to knowledge base 36 are shown therein. The details of a component of knowledge base 36, an extraction rule set 50 and an initial module of message processing module 38, a natural language extraction (NLE) module 52, are shown in FIG. 4.

Figure 4:
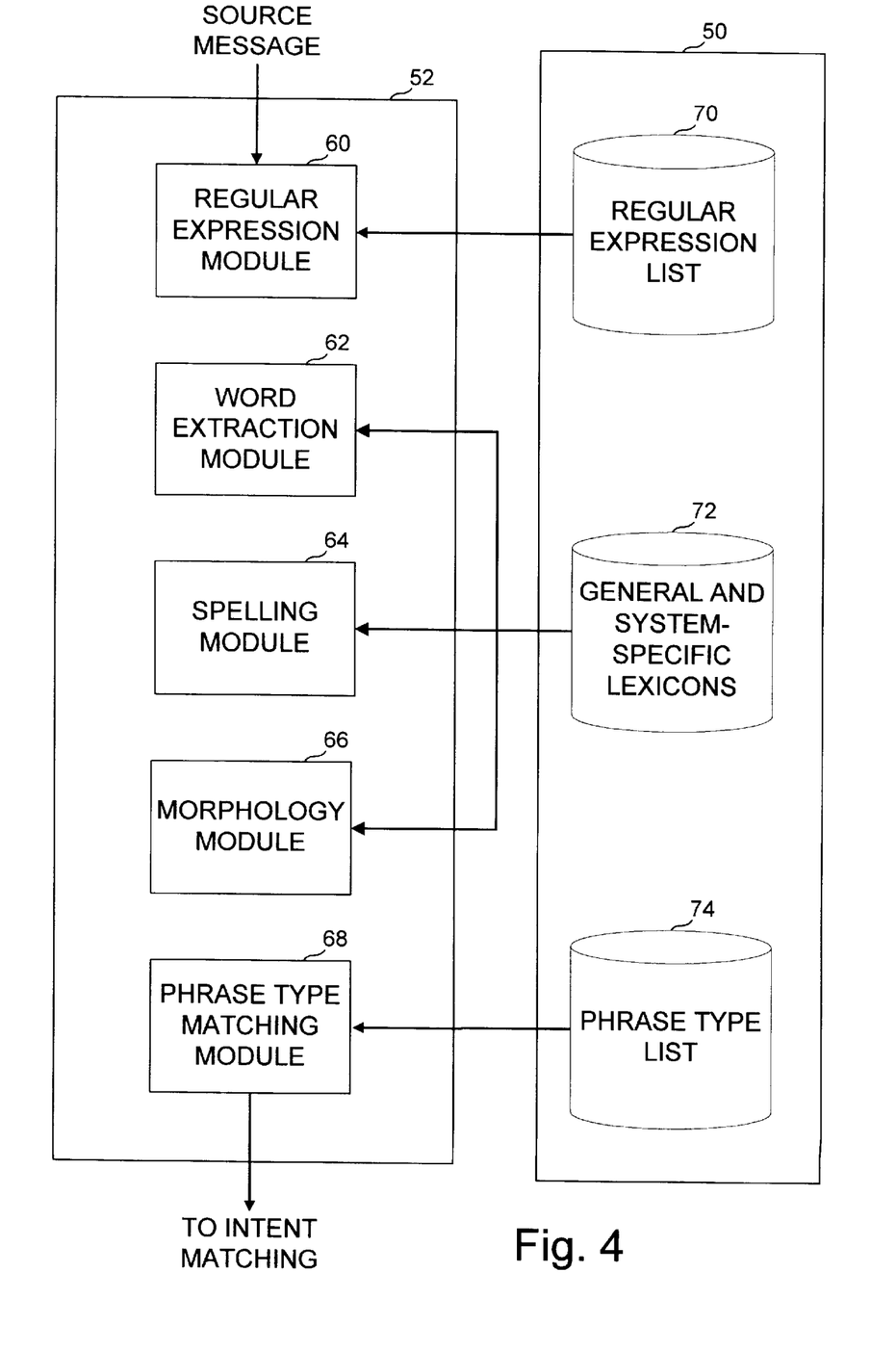
FIG. 4 is a block diagram showing the natural language extraction module of FIG. 3 in greater detail.

FIG. 4 shows NLE module 52 comprising a regular expression module 60, a word extraction module 62, spelling module 64, a morphology module 66, and a phrase-type matching of module 68. Extraction rule set 50 is shown comprising a regular expression lexicon 70 and overall lexicon 72 and a phrase type lexicon 74. The process of understanding and responding to text messages begins with accepting the input text message, which is first processed by NLE module 52. One possible ordering of modules within the NLE module shown in FIG. 4 is that the regular expression module 60 receives the input text message and reads from regular expression lexicon 70. Because the input text may include, in addition to natural language free-form text, other data constructs such as documents, graphic objects, field formatted text, and control characters, the input text is scanned for these data constructs which are not free-form text. All formatted data constructs are tagged for later use. As each module operates on the input message, it adds tags to the message. These tags are used in later stages to determine the intents present in the message and message classification. Depending on implementation, these tags may be inserted directly into the text of the message, or may be separated into an adjoining data structure. Regular expression module 60 looks for regular expressions which are known to regular expression lexicon 70. For example, regular expression lexicon may have rules for identifying regular expressions such as telephone numbers, e-mail addresses, customer account numbers, and part numbers. Regular expression module 60 identifies instances of the regular expressions represented in regular expression lexicon 70, it inserts tags into the message to indicate those regular expressions. Once a regular expressions is identified, it is excluded from further analysis in the free-form text. Modules 62, 64 and 66 then continue to operate on the free-form text.

Word extraction module 62 identifies the bounds of words. Most of the bounds are words can be identified by looking for one or more consecutive characters separated by a space character, but word extraction module 62 also identifies word boundaries in more unusual situations, such as where punctuation and typing errors might interfere with normal parsing. Spelling module 64 identifies incorrectly spelled words and adds tags to those words identifying the correct spelling. Characters and words not found in any phrase type or regular expression are ignored. An overall lexicon 72 contains words from a general dictionary as well as words specific to the system operator's business.

Morphology module 66 uses overall lexicon 72 to transform the words into their regularized form. For example, morphology module 66 might convert the word "said" to "say" in an effort to simplify the message. As should be apparent, modules 60, 62, 64, and 66 can operate on the input message non-sequentially. For example, after the spelling module removes a typographical error, the result may match a regular expression which was not earlier matched, in which case regular expression module 60 would add additional regular expression tags when the message is revisited.

Once the regular expressions are tagged, the word boundaries are identified, spelling is corrected, and text is regularized, the text is compared to a regularized list of phrase types from phrase type lexicon 74. As each phrase type is identified in the input message, phrase type tags are added to the message. Depending on the lexicon used and the input message, any given word may be tagged as part of one phrase type, multiple phrase types, or no phrase type. In the preferred embodiment, none of the operations performed by the various modules of NLE module 52 delete the original text, that is, characteristics other than phrase type and regular expression can be tagged to words in addition to phrase type and regular expression.

Referring back to FIG. 3, the input message with all the phrase types identified is passed to an intent matching module ("IMM") 54. In the preferred embodiment, the elements of the input message which are not associated with any identified phrase type are ignored and need not be passed on to IMM 54. IMM 54 identifies, for the phrase type(s) present in the input message, which intents are composed of the most similar phrase types. Generally, the intents are a set of typical cases for which appropriate response actions can be established. The system evaluates the match for each of the phrase types and for other data extracted from the input message text to determine which of the intents in knowledge base 36 is closest to the intents expressed in the input message text. An input message text may have several intents. These are identified and stored on an intents list associated with the input message text.

In addition to identifying the intent or intents of the writer, IMM 54 also will try to identify message characteristics of interest to the system operator. These characteristics may or may not be part of the writer's intent, or even be things the writer is aware of. For example, message processing module 38 might use phrase types and other deductions to determine whether the message is in a foreign language, is a continuation of an earlier message, or is a message with legal ramifications. This characteristic classification is appended to the accumulated information about the input message.

The confidence in the system's intent determination is represented by a variety of mechanisms, such as threshold scoring, which vary according to domain. In some situations only approximate information is needed, while in others information must be exact and conclusive. Important factors in confidence of the interpretation of an input message text include: the exactness of matches to a set of phrase types indicating intent, whether the information about the input text message supports ambiguous interpretations, and the sensitivity of the subject matter (for example issues of toxicology raises the sensitivity of a message).

Information is stored in the system's knowledge base to understand and interpret incoming messages, but the system is also able access information in external knowledge bases, which can be located at any location available on a network or internet. A typical example would be the checking account status of the writer of the incoming e-mail. This information can be used to determine response actions.

Searches and reasoning processes in the system as a whole are embodied in business and linguistic rules and functions specified by the system operator, using a combination of object editors, rule editors, browsers, and other tools which manipulate the knowledge base using the system operator's terminology, rather than computer languages.

Once the intents are identified, the message and the intents list is passed to an action mapping module ("AMM") 55, which generates a list of proposed actions. In the course of processing the input message text, decisions are made to add actions to a list for later evaluation. Actions are selected from among those deemed appropriate by the system operator, as expressed in a policy rule set 51. These tentative actions are discovered as the message is processed, and the actions are stored on an action list until all the intents of the message and other cogent information is identified. Once all plausible actions are tentatively identified, the actions are examined to determine if they are complete, correct and do not conflict with each other. For example, a tentative, general action which specifies the writer be answered automatically might conflict with an tentative action specifying that the specific intent must be answered manually. Actions which cannot, or should not, be executed are marked for non-execution and the remaining actions are executed. This process of resolving the correctness and consistency of the actions is performed by an action resolution module ("ARM") 56 which has as its input the intents identified in the message, as well as results from application of the policy rule set 51.

If one of the actions is a response to the writer, the composition of the response message text may include an explicit recitation of the writer's intent as determined by the system, as well as other phrases and extracted information relating to those intents. The actions taken are determined by ARM 56, and executed by an action execution module ("AEM") 57, with consultation of policy rule set 51. Depending on the list of actions, multiple responses and/or other actions may be initiated by AEM 57. In the preferred embodiment, a response to the writer will give an indication of how the writer's message was interpreted, in addition to giving the response. Thus, a response message may include a paraphrasing of the system's understanding of the intents, a statement about the nature of the response, and the response itself. In some systems, for debugging purposes or legal reasons, the input message text, response results and other processing information might be logged for later analysis, reporting or record keeping.

Optionally, the response will include tags which can be used to reference that response. This is useful where the writer determines their intentions were not correctly addressed by the system. If that occurs, the writer can send an additional message, possibly explicitly referencing the previous correspondence using the reference tag found in the response, in an attempt to clarify their intent. In addition, the response might include questions added by the system to query the writer on the efficacy of the response.

Optionally, management system 20 provides a set of methods and tools which assist the system operator in determining appropriate phrase types, intents, regular expressions and other data for knowledge base 36, using a corpus of message texts. The purpose of these methods and tools is to simplify the process of tailoring the information which is specific to the system operator's environment that is stored by the system for determining intents and message classifications. The system operator supplies a set of input messages which they have decided represent typical examples of input message intents that the system will later respond to automatically. The tool analyzes the entire text of the input message corpus determining which particular characters, words, and regular expressions are relevant to intents as specified by the system operator. One tool starts the analysis process not with an empty knowledge base, but a predefined knowledge base of phrase types, regular expressions and intents which are known to be generally useful for typical message classification. This tool searches for any missing information in each message in the corpus needed to reach the system operator specified intents. Management system 20 analyzes the input message text corpus as a whole, applying classification techniques similar to those which are implemented when the system will be answering single input message texts. Management system 20 determines the correspondence between statements made by the system operator about the input message text corpus and determines whether those statements increase the overall number of input message texts whose actions and classifications can be determined above a threshold of certainty. Management system 20 also searches for phrases and regular expressions which were not specified by the system operator and were not in the static knowledge base, but which could be used to complete a set of phrase types appropriate to particular intents. A list of suggested additions and deletions to the system's knowledge base is given to the system operator. These suggestions are then included in the system by use of the editors 34, browsers and editing tools.

Figure 5A:
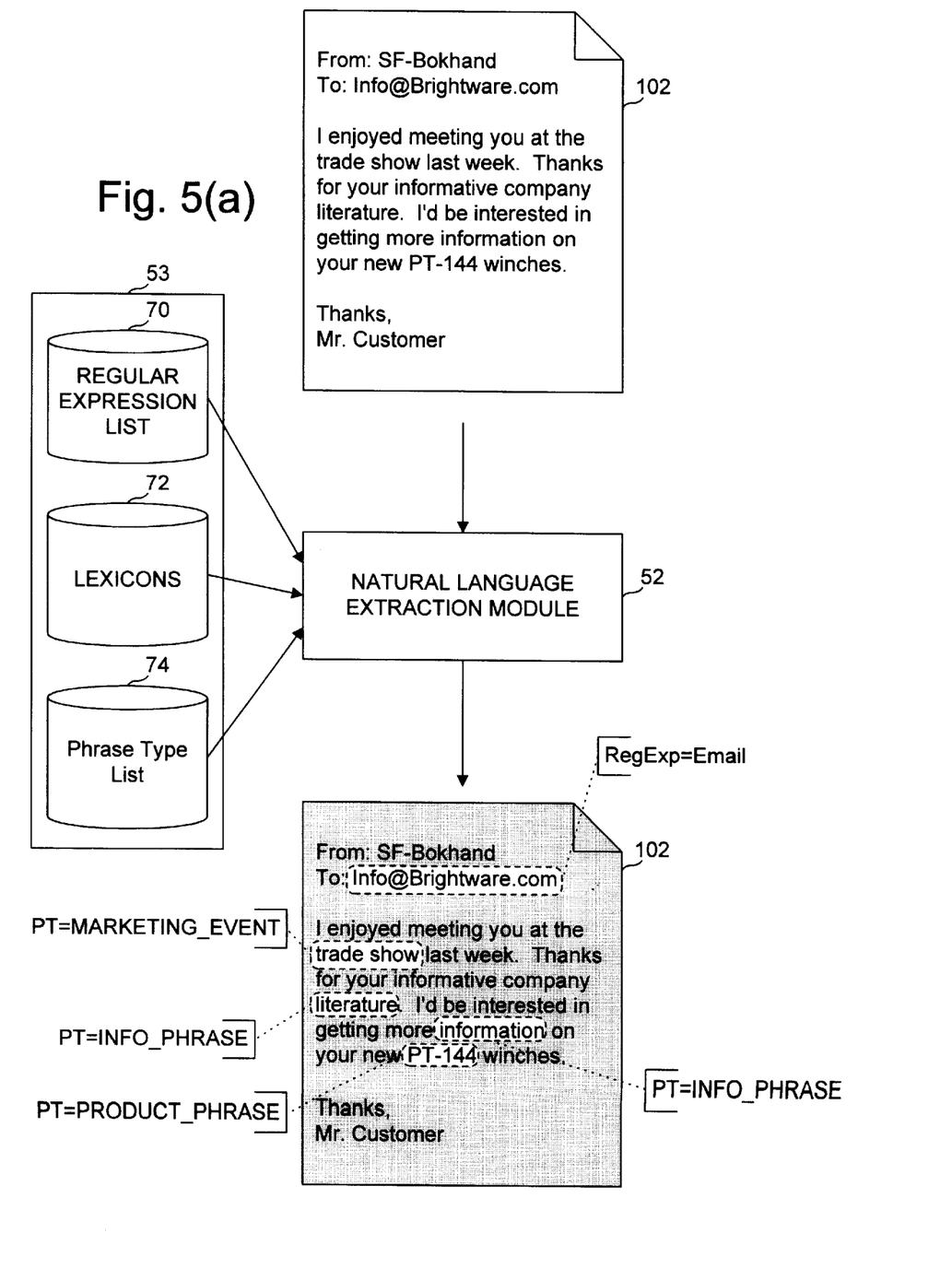
FIGS. 5(a)–(b) illustrate the process of using the apparatus shown in FIGS. 1–3 to automatically respond to a message.
Figure 5B:
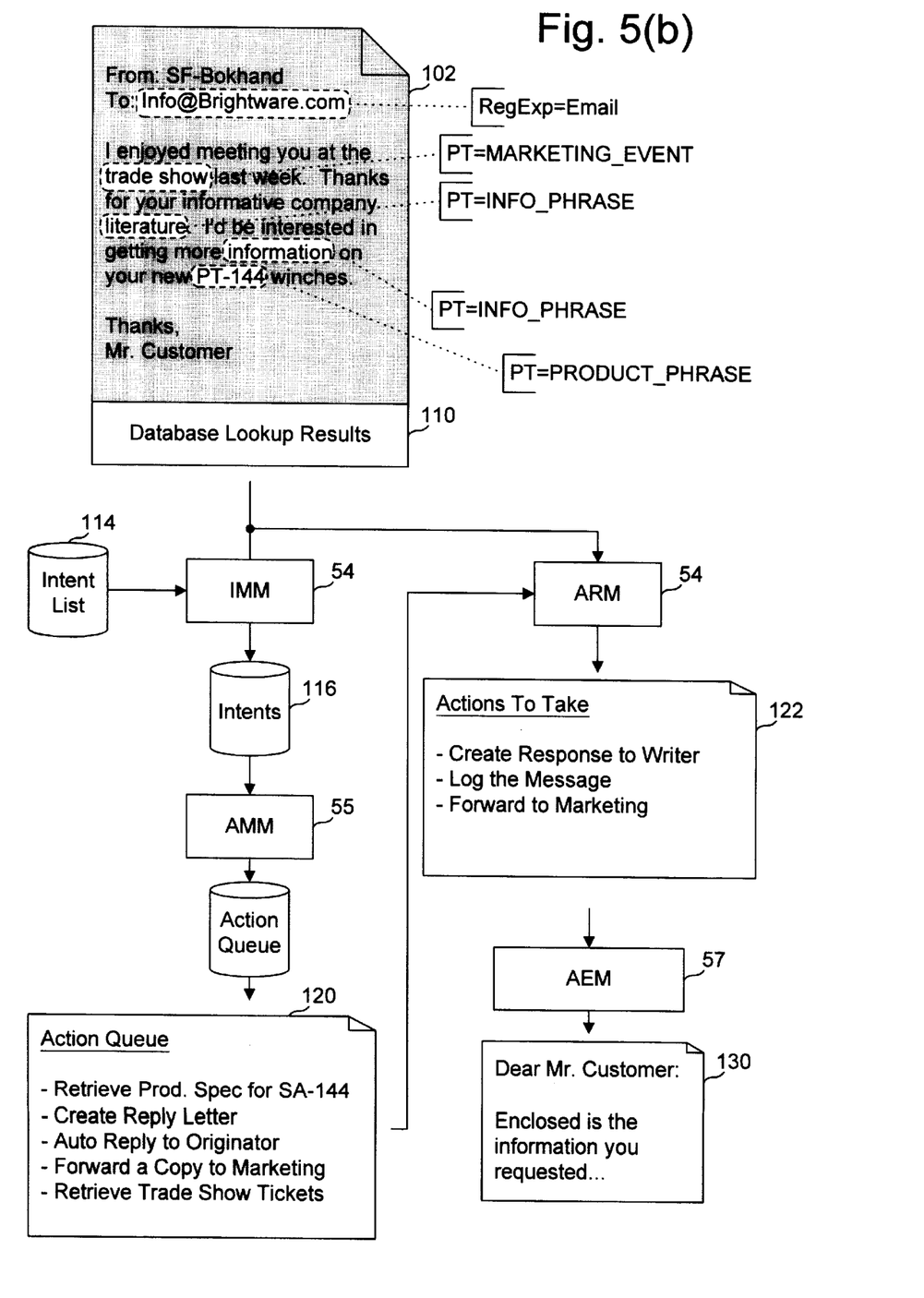

FIGS. 5(a)–(b) show an example of an input message 102 being processed by the system described above. The input message is processed by NLE module 52 to generate tags associated with portions of the input message. As described above, the tagged elements are the elements used to process the input message; the remaining text of the message (shown by shading in FIGS. 5(a)–(b)) need not be used.

As shown in FIG. 5(a), NLE module 52 uses a regular expression list 104 and a phrase types list 106 in assigning tags to a message. An example of regular expression list 104 and a phrase types list 106, as might be used in the example of FIG. 5(a), is presented in Table 1 and Table 2, respectively. Those lists contain only a few entries, but nonetheless illustrate the process. In an actual application, the lists would typically have many more entries.

TABLE 1

Regular Expression List

| Expression | Type |
|---|---|
| http://*{/*}> | URL |
| ###-###-#### | Phone |
| [a-zA-Z]@*.* | Email |
| . . . | . . . |

TABLE 2

Phrase Type List

| Phrase | Type |
| --- | --- |
| information | INFO_PHRASE |
| "product literature" | INFO_PHRASE |
| ... | ... |
| PT-140 | PRODUCT_PHRASE |
| PT-141A | PRODUCT_PHRASE |
| PT-143 | PRODUCT_PHRASE |
| PT-144 | PRODUCT_PHRASE |
| "trade show" | MARKETING_EVENT |
| ... | ... |
| #$%%$^!!* | PROFANITY_PHRASE |
| ... | ... |

Regular expression list 104 is used to isolate and identify character strings in the message which match the expressions in the list. If a regular expression from list 104 is matched in the message, the matching text is tagged with a "RegExp" tag. In the example shown, an e-mail address is matched and tagged with a "RegExp=Email" tag. Of course, in an actual application, more complex regular expressions could be listed, such as a regular expression that identifies not only that it is an e-mail address, but that it is the "To:" address. Other regular expressions will locate telephone numbers, or even the signature lines of an e-mail message.

Prior to the regular expression parse, the message might be pre-processed for structured data. For example, if attachments are included or data is included in the message in a structured format, such as "HTML" forms data, comma delimited data records, or an attached spreadsheet, that structured data is identified. Preferably, that structured data is flagged such that NLE module 52 does not need to process it.

After the regular expressions are tagged, the remaining text is scanned for phrase matches. In the preferred embodiment, spelling is corrected to the extent possible and words are reduced to their base morphological forms so that phrase matching is simplified. The matched phrases are tagged with phrase type ("PT") tags which identify the type of phrase. When deciding on intents and actions, the system uses the phrase type and the phrase value. The corresponding phrase values are shown in FIG. 5(a) surrounded by a dotted line. Several phrase types from list 106 are shown in Table 2. The phrase type "INFO_PHRASE" is used to identify words and phrases relating to information. "PRODUCT_PHRASE" is used to identify words and phrases associated with a particular product. In this example, the product part number is spelled out ("PT-144") making detection of it simple. However, some product phrases might be more complex, such as the phrase "your new four-door passenger van" which would be identified as a phrase of type "PRODUCT_PHRASE" even though no part number was mentioned. However, if the system was set up to address customer service for a non-automotive company or the application was such that it had no actions to take in which it mattered that the message writer is interested in a car, that phrase would not match any phrase type and would thus be ignored.

The other phrase type found in message 102 is "trade show" which is a "MARKETING_EVENT" phrase type. In this hypothetical, the system operator has added that phrase type to catch any messages expressing interest in the trade show so that tickets could be sent to the writer. Of course, as the message makes clear at least to a human reader, since the trade show was in the past, the system should not go so far as to actually send tickets, since it is too late to do so.

Also shown in Table 2 is a "PROFANITY_PHRASE" phrase type. This phrase type does not appear in message 102, but for messages which do have the profanity in them, the system can identify them. In such a case, the action taken might not relate to the intent of the message. For example, the message might contain a request for a refund and profanity. While the main intent of the writer is to get a refund, the classification of the system operator with respect to this message may well override the writer's intent. For example, the message might be classified not necessarily as a request for refund, but as a complaint. In this case, the existence of that phrase type might trigger an intent to discourage the writer or an intent to identify and respond to any complaints the customer might have. Those intents would, in turn, trigger an action of sending a polite response to the writer saying their message was classified as a complaint.

Although each of the identified regular expressions and phrase types are associated with separate text, there is nothing to prevent a word from being part of multiple, overlapping phrase types.

In any case, once the regular expressions and phrase types are identified, the analysis process continues, as shown in FIG. 5(b). Using the tagged phrases and regular expressions, the system performs any necessary database lookups. For example, a database lookup might be used to determine the customer's full identity just from a name in the message or the e-mail address. These database lookup results and other additional data fields are attached to the message as additional data 110. Of course, the additional data does not need to be explicitly attached to the message, but could be merely associated with a message or have a pointer to a message.

The message with its tags and additional data are then provided to intent matching module 54, which identifies the writer's and system operator's intents using an intent list 114. An intent list contains a set of intent cases. In the example shown, we assume that intent list 114 contains an intent entry such as:

Information_Request_Intent: <info_Phrase> and <product_
        phrase> which would identify one of the writer's intents as being an information request whenever an information phrase and a product phrase are found in a message.

The identified intents, the tags and their values are provided to action mapping module 55, which continues generating an action queue 120 based on the intents. For example, based on the intents which might have been associated with message 102, action mapping module 55 might have determined that the appropriate actions were to get product information to send to the writer, create a response letter template, reply to the writer, forward a copy to marketing (if the customer is a new customer), add the customer to the customer database (if a new customer), prepare electronic trade show tickets (or, if the tickets are not electronic, initiate the mailing process), etc. The retrieval of product information and creation of reply letter are triggered by a product information request intent, while the forwarding to marketing is based on an intent rule triggered by the system operator's intent.

Action queue 120 and the tagged elements of message 102 are passed to action resolution module ("ARM") 56 to resolve inconsistent actions on action queue 102. Of course, the entire message 102 might be passed along for use as uninterpreted text, as might be used to form a "quoted reply" type e-mail message.

In the example shown in FIG. 5(b), ARM 54 will note that the date of the trade show has already passed and the action of sending tickets is deleted from action queue 120. Other intents could eliminate or override other actions. For example, if message 102 had contained profanity and one of the intents of the system operator mapped the intent CENSURE_WRITER with the phrase type PROFANITY_PHRASE, the action for that intent might be to send a censure response and delete all other actions from action queue 120. Many variations of these structures for specific applications will be apparent to one of skill in the art after reading this disclosure.

Once the actions to be taken are resolved, a list 122 of actions to take is passed to action execution module ("AEM") 57, which performs the actions listed on list 122, such as creating a response 130. A preferred response 130 includes all or part of the original message, information satisfying the writer's intent (if the writer's intent was to get a response of some sort) and an indication of how the message was interpreted. One way to show how the message was interpreted is to show the tags and the values for tagged regular expressions and tagged phrase types.

The above description discloses how to make and use embodiments of an automated text understanding and response system. As explained herein, the task of interpreting message text is greatly simplified by not processing text with which no action is to be taken. In such a system, a system operator familiar with their business, but not necessarily with the details of how to construct an electronic dictionary, could compile rules mapping intents to actions and phrase types mapping to intents, as well as specifying the conditions for system operator intents.

The above description is illustrative and not restrictive. A number of interesting variations of the invention will become apparent to those of skill in the art upon review of this disclosure. Merely by way of example, the writer and system operator need not be a customer and business, respectively. The writer could be a person doing research on a topic on which the system operator has a special expertise. The scope of the invention should, therefore, be determined not with reference to the above description, but instead should be determined with reference to the appended claims along with their full scope of equivalents.

What is claimed is:

1. A method of handling electronic mail messages based on message content, comprising the steps of:
    inputting a message;
    generating from content of the message a set of tokens representing the content which tokens are tagged and regularized;
    matching each token in the set of tokens against a lexicon, resulting in a set of standard lexical tokens for the message;
    comparing the set of standard lexical tokens to phrase expressions in a collection of lexicon entries, wherein each lexicon entry comprises a phrase expression and an associated phrase type;
    identifying writer intents from the associated phrase types found in the step of comparing;
    selecting, from a set of action records mapping intents to actions, action records which are mapped from at least one intent and includes an associated set of actions, based on matching message intents;
    generating a self-consistent subset of the selected actions; and
    executing the self-consistent subset of the selected actions.

2. The method of claim 1, wherein handling a message is a process of selecting at least one of responding to the message, routing the message or disposing of the message.

3. The method of claim 1, wherein the lexicon comprises correctly spelled words and base word forms.

4. The method of claim 1, wherein the phrase type is selected from a word, a plurality of words, a word phrase, a plurality of word phrases, a regular expression text pattern, a plurality of regular expression text patterns, a message formatting, a plurality of message formatting or a set of phrase types.

5. The method of claim 1, wherein the self-consistent subset of the selected actions comprises all of the selected actions when all of the selected actions are self-consistent.

6. The method of claim 1, wherein the at least one intent from which an action record is mapped is either a writer intent or a responder intent.

7. The method of claim 6, wherein the responder intent is derived from business rules of an operator of a system handling the message.

8. The method of claim 1, wherein the at least one message classification reflects observed conditions or deduced conditions independent of the writer intents.

9. The method of claim 1, further comprising a step of evaluating message content to identify missing phrase types which are candidates to be added to the lexicon.

10. The method of claim 1, further comprising the steps of:
    identifying at least one message classification from the content of the message;
    selecting additional actions based on the at least one message classification; and
    including the additional actions in the step of generating a self-consistent subset of actions.

11. The method of claim 1, wherein each action record represents a response to a writer intent and is selected from a direct response to the writer, a routing referral to a human reader, or a call to an external computer program.

12. The method of claim 1, further comprising the steps of:
    separating free form text in the content from structured text in the content, prior to the step of generating the set of tokens; and
    detecting free form text embedded in the structured text, prior to the step of generating the set of tokens, wherein the set of tokens included tokens representing the embedded free form text.

13. The method of claim 1, wherein the step of identifying writer intents comprises the steps of:
    matching identified tokens to a database of regular expression patterns; and
    matching identified tokens to a database of phrase types other than regular expression patterns.

14. The method of claim 13, wherein the identified tokens comprise regularized tokens and tokens prior to regularization.

15. The method of claim 1, further comprising the steps of:
    matching the identified phrase types and message formatting types to the phrase types and message formatting types of prototype message intents described by groups of associated phrase and message formatting types.

* * * * *

UNITED STATES PATENT AND TRADEMARK OFFICE
CERTIFICATE OF CORRECTION

| | | |
|---|---|---|
| PATENT NO. | : 6,278,996 B1 | Page 1 of 1 |
| DATED | : August 21, 2001 | |
| INVENTOR(S) | : Richardson et al. | |

It is certified that error appears in the above-identified patent and that said Letters Patent is hereby corrected as shown below:

<u>Title page,</u>
Item [54], "PROCESS" should read -- PROCESSING --

Signed and Sealed this

Twenty-third Day of April, 2002

*Attest:*

JAMES E. ROGAN
*Attesting Officer*     *Director of the United States Patent and Trademark Office*